(12) United States Patent
Stöcklin et al.

(10) Patent No.: US 11,553,642 B2
(45) Date of Patent: Jan. 17, 2023

(54) DISTRIBUTING MACHINE AND METERING ELEMENT SUITABLE FOR SAID DISTRIBUTING MACHINE

(71) Applicant: RAUCH Landmaschinenfabrik GmbH, Sinzheim (DE)

(72) Inventors: Volker Stöcklin, Ringsheim (DE); Thomas Zeitvogel, Rheinmünster (DE); Franz Doll, Sinzheim (DE)

(73) Assignee: RAUCH LANDMASCHINENFABRIK GMBH, Sinzheim (DE)

( * ) Notice: Subject to any disclaimer, the term of this patent is extended or adjusted under 35 U.S.C. 154(b) by 700 days.

(21) Appl. No.: 16/491,663

(22) PCT Filed: Mar. 5, 2018

(86) PCT No.: PCT/EP2018/000085
§ 371 (c)(1),
(2) Date: Sep. 6, 2019

(87) PCT Pub. No.: WO2018/162116
PCT Pub. Date: Sep. 13, 2018

(65) Prior Publication Data
US 2020/0000019 A1    Jan. 2, 2020

(30) Foreign Application Priority Data

Mar. 9, 2017 (DE) .................... 20 2017 001 237.5

(51) Int. Cl.
*A01C 17/00* (2006.01)
*A01C 19/02* (2006.01)

(52) U.S. Cl.
CPC ............ *A01C 17/008* (2013.01); *A01C 19/02* (2013.01)

(58) Field of Classification Search
CPC ..... A01C 17/008; A01C 19/02; A01C 17/006; A01C 17/00; A01C 19/00
See application file for complete search history.

(56) References Cited

U.S. PATENT DOCUMENTS 3,191,944 A    6/1965 Watts

FOREIGN PATENT DOCUMENTS

DE    36 1 7 302 A1    11/1987
DE    3617302 A1 *  11/1987  ............. A01C 17/00
(Continued)

*Primary Examiner* — Christopher J. Novosad
(74) *Attorney, Agent, or Firm* — McGlew and Tuttle, P.C.

(57) ABSTRACT

A distributing machine—spreading machine and/or sowing machine includes a container, receiving material to be distributed, supported by a support frame, an outlet opening on the base of the container, a metering element downstream of the outlet opening, a motor-driven metering slide displaceable relative to the outlet opening, and a distributing element downstream of the metering element, for distributing the material. For adjusting a speed of the metering slide, while providing a compact design, the metering slide of the metering element includes a threaded spindle that is mounted axially fixed and is driven in rotation by a motor rotary drive having an axially fixed output shaft. Along the threaded spindle, a spindle nut is guided that engages with the threaded spindle. The spindle nut is connected to the metering slide, or to a lever arm arrange thereon, to actuate the metering slide by rotation of the threaded spindle.

19 Claims, 4 Drawing Sheets

(56) References Cited

FOREIGN PATENT DOCUMENTS

| | | |
|---|---|---|
| DE | 4012826 A1 | 10/1991 |
| DE | 4105059 C2 | 8/1992 |
| DE | 101 26 233 A1 | 12/2002 |
| DE | 102005015228 A1 | 10/2006 |
| DE | 102013104024 A1 | 11/2014 |
| EP | 0489674 B1 | 6/1992 |
| EP | 0682857 B1 | 11/1995 |
| EP | 1145614 B1 | 10/2001 |
| EP | 2057876 A1 | 5/2009 |
| EP | 2454928 B1 | 5/2012 |
| EP | 2727449 A1 | 5/2014 |

\* cited by examiner

DISTRIBUTING MACHINE AND METERING ELEMENT SUITABLE FOR SAID DISTRIBUTING MACHINE

CROSS REFERENCE TO RELATED APPLICATIONS

This application is a United States National Phase Application of International Application PCT/EP2018/000085, filed Mar. 5, 2018, and claims the benefit of priority under 35 U.S.C. § 119 of German Application DE 20 2017 001 237.5, filed Mar. 9, 2017, the entire contents of which are incorporated herein by reference.

TECHNICAL FIELD

The invention relates to a distributing machine, in particular a spreading machine and/or sowing machine, having at least one container, supported by a support frame, for receiving powdered and/or particulate material to be distributed, at least one outlet opening arranged on the base of the container, a metering element that is arranged downstream of the outlet opening and that has a motor-driven metering slide that can be displaced relative to the outlet opening, and at least one distributing element, arranged downstream of the metering element, for distributing the material to be distributed on the ground. The invention additionally relates to a metering element, having a motor-driven metering slide that can be displaced relative to an outlet opening, that is suitable for use in such a distributing machine.

TECHNICAL BACKGROUND

Distributing machines of the aforementioned type are known principally, on the one hand, in the form of agricultural spreading machines for spreading powdered or particulate material such as, in particular, fertilizer or seed, in a multiplicity of designs, thus for example as a towed model, or as a model received by a three-point linkage of a towing machine, such as a tractor. Such distributing machines comprise a container, which receives the material to be distributed and arranged on the base of which there are usually one or two outlet openings, a metering element being assigned to the respective outlet opening for the purpose of removing the material to be distributed, in the desired quantity—or, more precisely: at the desired mass flow rate—from the container. The metering element frequently comprises a metering slide that can be displaced—whether translationally or, in particular, rotationally—in relation to the outlet opening, and that, by means of a suitable actuator, in the form of a hydraulic or electric cylinder, can be controlled to open and close to enable the desired mass flow rate to be set according to a desired distribution width and a required spread quantity of the material to be distributed per unit of area on the ground, according to a travel speed and according to the physical properties of the material to be distributed, such as, for example, its flowability. Beneath the metering element there is a distributing element, by means of which the material to be distributed is distributed over the desired working width. Some distributing machines are furthermore equipped with a means for adjusting the point at which the material to be distributed is fed to the distributing element, which in particular is formed by a distributor disk fitted with projection vanes, the feed point being adjustable radially (in particular for the purpose of enlarging/reducing the spread fan) and/or in the circumferential direction (in particular to the purpose of rotating the spread fan, for instance about the axis of rotation of the distributor disk) in relation to the distributor disk. Such an agricultural distributing machine is known, for example in the form of a dual-disk spreader, from DE 10 2005 015 228 A1.

On the other hand, there are known distributing machines of the generic type in the form of winter service spreading machines, on which the container serves principally to receive grit and/or road salt, normally in granular form, the functioning of such a winter service spreading machine largely corresponding to that of the agricultural spreading machine described above.

Normally, during spreading of the material to be distributed—whether in the form of fertilizer or seed on a field, or in the form of grit or salt on a road—large quantities of particles of soil, sand, dust and the like are swirled up, which in particular can reach the metering elements, arranged beneath the container, and their actuating cylinders, with the result that, depending on the nature and size of the particles, functioning can be impaired if, for example, larger particles, including small stones, become wedged there. Moreover, in particular, the material to be distributed, which is also in the form of a powder or particles, frequently tends to accumulate on the metering elements located beneath the container, or on the actuating cylinders that serve to actuate their metering slides, most solid fertilizers, as well as road salt, being of a hygroscopic nature, such that they agglomerate in combination with air humidity or even rain, or snow (slush), and increasingly adhere in agglomerates of greater or lesser hardness to the aforementioned functional parts as spreading progresses. This applies in particular—if not exclusively—when the distributing elements are formed by spreading or distributor disks that spin the powdered or particulate material radially past the metering elements.

EP 2 727 449 A1 addresses this problem, in the case of a distributing machine of the generic type, with a cleaning means that is arranged beneath the container and equipped with a plurality of fluid nozzles. Although this offers crucial advantages—including in respect of cleaning of the metering elements themselves or of the distributing elements—the increase in the accumulation of dirt on the actuating cylinders that occurs between the performed cleaning operations also represents a problem in respect of their functional and maintenance reliability, and their necessary robustness.

If these actuating cylinders, provided to drive the metering slide of the metering elements, are hydraulic cylinders, of which the translational movement of the piston rod into and out of the cylinder is converted, by means of appropriate levers (lever systems), into a translational or rotational movement of the metering slide, such as are frequently used because of the ease of connecting them to the hydraulic system of a tractor, on the one hand it is also necessary, because of the aggressive ambient conditions, for the piston rods of the hydraulic cylinders to be produced from very hard and chemically resistant materials, such as chrome-plated high-grade steel; on the other hand, the requirements for the sealing elements used to seal the piston rods with respect to the cylinder are very stringent, since during operation the piston rods are continuously, if only slightly, pushed out of and into the cylinder, with the resultant risk of foreign bodies adhering to the piston rod, and/or moisture being pulled into the inside of the hydraulic cylinder. Furthermore, to ensure that hydraulic cylinders operate properly and with little wear, there should be a film of oil on their piston rod, but on the other hand the film of oil, because of its adhesive nature, increases the risk of dirt accretions becoming caked-on, and thus being pulled into the internal oil circuit. Moreover, the piston rod, when at least partly drawn out from the hydraulic cylinder, can also be exposed to aggressive ambient conditions over months outside of the period of operation—which, in the case of distributing machines of the generic type, is usually seasonal—such that corrosion occurs, despite the expensive and inert materials. DE 10 2013 104 024 A1 attempts to counteract this problem, for example, with a protective housing of the hydraulic cylinder, but here, likewise, there is the difficulty of a perfect tightness of seal, and the above statements apply to the necessary materials and the robustness of the hydraulic cylinder itself.

Finally, in the case of metering elements of the generic type having a metering slide that can be displaced relative to the outlet opening of the container serving to hold the material to be distributed, if the metering slide is driven by means of a hydraulic cylinder there is a further problem in that, to set a desired metering rate (corresponding to a particular opening position of the metering slide relative to the outlet opening) by means of a scale and a fixing system, it is necessary to set a stop, corresponding to the desired opening position of the metering slide, against which the hydraulic cylinder can then stop. In this way, although a particular metering rate, or a particular mass flow rate of material to be distributed can be set, this cannot be altered if, for example, the travel speed changes with respect to the speed originally provided for (and a higher or lower metering rate would be required as a result).

For this reason, instead of using hydraulic cylinders to drive the metering slides of the metering elements, modern distributing machines frequently use electric cylinders, of which the translational movement of the piston rod into and out of the cylinder is converted into a translational or, in particular, a rotational movement of the metering slide by means of suitable levers (lever systems), in a manner corresponding to that of hydraulic cylinders. Such electric cylinders are frequently equipped with displacement sensors in order to sense, and in particular to use for control purposes (DE 40 12 826 A1), the exact extension position of the piston rod in relation to the cylinder, which position is representative of the opening position of the metering element.

However, in the case of electric cylinders, likewise, the aggressive dusts or particles of mineral fertilizer, salt, or also other dirt accretions, that act from the outside upon the actuating elements of the metering elements in the case of distributing machines according to the invention constitute a not inconsiderable functional problem. Thus, for example, when the piston rod is being drawn into or pushed out of the electric cylinder, an overpressure or partial vacuum, respectively, is produced inside the cylinder, which pressure can be compensated outwardly by means of suitable valves in the case of applications not of the generic type, but this is difficult to achieve in the case of distributing machines, because ambient dust and/or moisture could enter the cylinder through the vale and result in corrosion. On the other hand, the partial vacuum prevailing inside the cylinder when the piston rod is in the extended state in turn presents the risk of dust and/or moisture being drawn in, such that—as also in the case of hydraulic cylinders—it is necessary to ensure very high sealing tightness, which in practice is achievable only with very expensive special seals. If encrusted or hardened agglomerates have formed on the piston rod, they also have to be safely broken down and removed by effective mechanical scrapers, in order not to damage such special seals and to maintain the high sealing tightness. The high sealing tightness in this case is also extremely important in this respect especially in the case of electric cylinders, because the displacement sensor system, for sensing the current extension position of the piston rod, is usually accommodated inside the cylinder. In the case of ingress of—solid and/or liquid—dirt accretions, however, such displacement sensors suffer damage, whether as a result of mechanical impairment or as a result of corrosion, such that the position sensing becomes inaccurate or completely ineffective, and consequently there are malfunctions in respect of the metering rate.

The same applies to a very large extent to the case of electric-motor spindle drives for displacing the metering slide of the metering element, which drives likewise use parts that telescope into each other, and with which the spindle that can be moved translationally into and out of the motor housing again runs the risk of drawing particulate or fluid dirt accretions into the motor housing and damaging the electric motor itself or its sensors, the said dirt accretions being deposited in a particularly intractable manner in the spiral spindle thread, and being practically no longer separable with continued operation, or with continued insertion and retraction of the spindle into and out of the motor housing. Such an electric-motor spindle drive, provided with a transmission, of a rotatably mounted metering slide of a metering element of a disk spreader can be found in DE 41 05 059 C2, wherein coupled in an articulated manner to the free end of the translationally displaceable spindle is a lever that connects the latter to the metering slide, and in addition a position sensing sensor, arranged inside the motor housing that carries the spindle, is assigned to the electric-motor spindle drive. A similar spindle drive of a rotatably mounted metering slide of a metering element for disk spreaders is known from DE 36 17 302 A1, in which the one end of a lever that carries the metering slide is again coupled in an articulated manner to the adjusting spindle that can be inserted into and extended out of the motor housing, the lever additionally being connected to a displacement transducer for sensing its current position.

All the functional impairments caused by the above problems necessarily result in a stoppage of the working of the distributing machine, which generally can be put only with difficulty, or cannot be put at all, into a kind of manual emergency operation. However, since use of distributing machines of the generic type is almost exclusively seasonal, and there is usually only a short time window available for their use (whether in the case of seasonal fertilizer application at a predefined crop state, or whether in the case of a sudden snowfall), such outages of the distributing machine must be avoided insofar as absolutely possible.

Another, further, problem of the electric cylinders that are used to actuate the metering slide of metering elements of the generic type and that have parts that telescope into each other is that, owing to increasing size (or increasing working widths) and increasing travel speeds, as well as increasing automation processes, there is a need for ever greater speeds of retraction and extension of the piston rod, or of the adjusting spindle, into and out of the electric cylinder. Since the efficiency of electric cylinders is relatively low, owing to the considerable expenditure of force for what is usually friction-intensive operation, there is consequently an ever greater demand for available electrical power. This is disadvantageous, not only with regard to a high electrical energy consumption, but also, in particular, with regard to the fact that electric cylinders of distributing machines of the generic type normally have to be supplied with power from the electrical system of the towing vehicle, with generally only a 12 V power system being available, both in agricultural vehicles and in conventional road vehicles. If the distributing machine is one that has electrical or electronic open-loop and/or closed-loop control of a plurality of functions of the distributing machine, there may be up to six electrical actuating drives (two for each of the metering elements, the possibly present means for adjusting the feed point, and for possibly present agitators) that, when operating simultaneously together with the open-loop/closed-loop control electronics themselves, and with an operator control unit that is usually assigned to the latter, require very large amounts of electrical power. This can result in very high amperages, up to a collapse of the vehicle electrical system, or up to an emergency shut-down by means of the fuses, such that there is a need to improve the poor efficiency of electrical actuating cylinders.

As already mentioned, frequently distributing machines of the generic type are equipped with means for adjusting the point at which the material to be distributed is fed to the adjusting elements, in respect of the structural design of which means substantially three embodiment variants are known, which comprise

- a rotatable mounting of a base provided with the outlet opening from the container;
- a mounting, which is coaxially rotatable with the distributing element, of a sleeve that is arranged downstream of the metering element and that has a radial feed opening to the distributing element; or
- a rotatably, or also translationally, movable mounting of a chute or channel arranged downstream of the metering element. With regard to the first-mentioned alternative, EP 2 057 876 A1, for example, describes a distributing machine in the form of a dual-disk spreader, assigned to both distributor disks of which is a respective means, for adjusting the feed point of the material to be distributed, each comprising a respective rotatable base that are each provided with an outlet opening of the container. The rotatable bases are driven by means of a respective electric cylinder, which can be actuated separately from each other, or by means of a common electric cylinder and a corresponding lever system. With regard to the second alternative, for example EP 1 145 614 B1 discloses a distributing machine, again in the form of a disk spreader, which comprises a sleeve that is arranged directly above the surface of the distributor disk and that is coaxially rotatable with the latter, by means of an electric cylinder. The material to be distributed is supplied to the sleeve by means of the metering element and fed, via a radial feed opening of the sleeve, onto the surface of the distributor disk, in the central region thereof. Depending on the rotary position of the sleeve, its feed opening is shifted in the circumferential direction of the distributor disk such that—in a manner similar to that of the first alternative, described above—the feed point is adjusted in the circumferential direction of the distributor disk. With regard to the third alternative, there are known from EP 0 489 674 B1, EP 0 682 857 B1 or EP 2 454 928 B1, for example, distributing machines, in the form of disk spreaders, in which the material to be distributed is fed by means of the metering element or a rotatably mounted chute or channel. As a result of the chute being rotated, by means of its assigned electric cylinder, its free end is shifted relative to the distributor disk, which is mounted in a stationary manner, in order to adjust the point at which the material to be distributed is fed there—usually both in the radial and in the circumferential direction thereof—to the distributor disk.

SUMMARY

The invention is based on the object of developing, in a simple and cost-effective manner, a distributing machine of the type stated at the outset, and a metering element suitable for said distributing machine, to the effect that the operational reliability of the metering element, and in particular also the adjustment speed of its metering slide, is increased, while at least largely avoiding the aforementioned disadvantages, even in the presence of aggressive powdered or particulate substances, including moisture, or wet conditions, wherein the metering element, including the actuating drive of its metering slide, should preferably be made as compact as possible.

According to the invention, this object is achieved, in the case of a distributing machine of the type stated at the outset, or in the case of a metering element suitable for said distributing machine, in that the drive of the metering slide of the metering element comprises a threaded spindle that is mounted in an axially fixed manner and that is driven in rotation by means of a motor rotary drive having an axially fixed output shaft, guided along which threaded spindle is a spindle nut that is in engagement with the threaded spindle and that is connected to the metering slide, or to a lever arm arranged thereon, in order to actuate the metering slide by rotation of the threaded spindle.

The design according to the invention of the actuating elements of the metering slide of the metering element, having the spindle nut in engagement with the axially fixed, but rotatably mounted threaded spindle eliminates, firstly, all problems associated with the actuating elements according to the prior art that comprise parts that telescope into each other, in respect of harmful caked-on dirt accretions such as particles of material to be distributed, dirt and/or moisture, on their piston rod or adjusting spindle, since the threaded spindle, mounted in an axially fixed manner, can be put into rotation by means of a rotary drive that acts purely rotationally, and the output shaft of which is consequently likewise rotatable but mounted in an axially fixed manner (regarding which, see also below), and thus there is no significant risk of dirt accretions entering the drive motor, without the need for parts that telescope translationally into one another, and having levers coupled thereto in an articulated manner, for driving the metering slide. Instead, the invention provides that the purely rotational movement of the axially fixed output shaft of the motor rotary drive is transmitted to the threaded spindle, likewise mounted in an axially fixed manner, of which the spindle nut, which is in engagement with it, converts this rotational movement into a translational movement along the threaded spindle and, in so doing, drives the metering slide, or a lever arm arranged thereon, in order to provide for differing (partial and complete) opening positions of the metering slide, and at least one closed position thereof, in which the metering slide completely closes the outlet opening.

As explained in greater detail further below, in this case the drive of the metering slide according to the invention can also be made very compact and space-saving in the absence of telescoping parts having levers coupled thereon in an articulated manner, and is thus ideally suited for the very limited structural space available beneath the container, serving to store the material to be distributed, of distributing machines of the generic type such as, in particular (dual-) disk spreaders, and it is also an option in combination with any known embodiments of means for adjusting the point at which the material to be distributed is fed onto the distributing elements, as have been described above.

Further, in the absence of actuating elements that telescope into each other, the expenditure of force of the drive of the metering slide according to the invention is significantly less than in comparison with the prior art, and consequently the efficiency is significantly greater than that of electrical actuating cylinders, such that the energy consumption is reduced and, at the same time, there is no risk of overloading the electrical supply system of the distributing machine itself or of a towing machine, such as a tractor or a road vehicle. Accordingly, owing to the lesser driving forces required, there is less wear, reducing the service intervals and, in particular, minimizing the risk of breakdown during the seasonal deployment, just at the time in which the distributing machine is required. Moreover, very high adjustment speeds of the metering slide can be achieved without difficulty, in particular as a result of the use of electric-motor rotary drives, explained in greater detail below, for driving the threaded spindle, since dissimilarly lesser limits are set for the rotational speed of such rotary drives than is the case with translational retraction and extension movements of telescoping piston/cylinder units, as are used in the prior art for actuating the metering slides.

It should be noted at this point that "axially fixed" threaded spindle, or "axially fixed" output shaft, of the motor rotary drive, within the meaning of the present disclosure, clearly refers to the operating state following final mounting, whereas, in the course of mounting or demounting, e.g. following detaching of the corresponding bearings, it may clearly be possible to move the threaded spindle and/or, in particular, the output shaft of the rotary drive, in the axial direction in order, for example, to enable it to be mounted and demounted.

Consequently, the threaded spindle may preferably be driven in rotation by means of an electric-motor rotary drive, such as an electric motor, the output shaft of which—as also the threaded spindle—is mounted in an axially fixed manner during operation and transmits, not a translational movement, but an exclusively rotational movement to the threaded spindle. Found to be particularly advantageous in this connection are, for example, brushless direct-current motors, or servomotors, which not only have a high efficiency with very high rotational speeds, but are also only slightly self-inhibiting such that, in the event of a failure, a slight manual emergency actuation is possible (concerning which, see also below).

It may be provided in this case, on the one hand, for example, that the threaded spindle is constituted by the output shaft of the motor rotary drive or is connected thereto in a rotationally fixed manner, the rotationally fixed connection of the output shaft of the electric motor rotary drive preferably being detachable from the threaded spindle in order to provide for ease of mounting and demounting.

On the other hand it may be provided, in particular, that the threaded spindle is connected to the output shaft of the motor rotary drive by means of a belt drive, in particular in the form of a toothed-belt drive, or also in the form of a round, flat, vee-type, ribbed belt drive or the like, or by means of meshing toothed wheels, or also by means of friction wheels, which may be advantageous, in particular, in respect of a highly space-saving, compact structure of the drive and, moreover, enables the rotational speed of the output shaft of the electric motor rotary drive to be stepped down to the rotational speed of the threaded spindle, provided that the toothed or friction wheel, or the (toothed) belt wheel, seated on the output shaft has a diameter (appreciably) greater than that of the threaded spindle, or of a shaft carrying the latter, in order to provide not only for a very rapid, but also extremely precise, actuation of the metering slide, which is connected to the spindle nut that is guided along the threaded spindle and in engagement with it.

For corresponding reasons, and also advantageously in terms of construction, in this case the output shaft of the electric motor rotary drive may be arranged, in particular, substantially parallel to the threaded spindle that, for its part, moreover, advantageously extends in a plane approximately parallel to the displacement plane of the metering slide. Furthermore, in the case of both of the aforementioned embodiments, again in respect of a compact structure, the output shaft of the electric motor rotary drive may comprise, for example, only an axially fixed shaft stub, the rotational movement of which is transmitted, either by rotationally fixed connection to the threaded spindle that is arranged coaxially therewith and likewise mounted in an axially fixed manner, or to a shaft carrying the threaded spindle, or by meshing toothed or frictional wheels or (toothed) belt drives, to the threaded spindle, or to the shaft carrying the latter.

The design, according to the invention, of the drive of the metering slide of the metering element makes it possible in principle, because of its connection to the spindle nut, which can be displaced translationally along the threaded spindle that, for its part, is mounted so as to be driven in rotation but axially fixed, for the metering slide to be displaced translationally, in particular substantially parallel to the axial direction of the threaded spindle, such as, for example, along a guide of the metering slide extending approximately parallel to the threaded spindle.

Instead, the drive, according to the invention, of the metering slide of the metering element also makes it possible, in particular, for the metering slide to be rotationally displaceable, in particular about a, for example approximately vertical, pivot axis arranged substantially perpendicularly in relation to the axial direction of the threaded spindle and/or at a radial distance therefrom, as is mostly the case with distributing machines of the generic type.

For the purpose of exact guidance along the threaded spindle, the spindle nut may be guided along the threaded spindle by means of a sliding block, in which it is fastened in a rotationally fixed manner, there also being conceivable, in principle, any other known guides of the spindle nut that always provide for a rotationally fixed arrangement of the spindle nut, while ensuring a translational displacement along the threaded spindle, to enable it to be driven by rotation of the threaded spindle.

In order, particularly in the case of a pivotably mounted metering slide, to take account of its distance variations, during pivoting, in relation to the usually linearly extending threaded spindle, the metering slide, or the lever arm arranged thereon, may in principle be connected to the spindle nut by means of levers (lever systems), known per se from the prior art, coupled in an articulated manner, on the one hand, to the metering slide or to the lever arm arranged thereon, on the other hand to the spindle nut. It has proved advantageous, however, in respect of a comparatively substantially more compact design that is simpler and more cost-effective in terms of construction with, in addition, a more exact transmission of the translational movement of the spindle nut to the rotationally displaceable metering slide, if the spindle nut or the sliding block has at least one driver, which is preferably detachable for ease of mounting and demounting, which extends substantially perpendicularly in relation to the axial direction of the threaded spindle as well as, expediently, approximately parallel to the pivot axis of the metering slide, and which is in engagement with an oblong hole of the metering slide or of the lever arm arranged thereon. When the spindle nut, or the sliding block, consequently moves translationally along the threaded spindle, which rotates in an axially fixed manner, the driver of the spindle nut, which is formed, for example, substantially by a stud having a circular cross section, or a cross section that is complementary to, but shorter than, the oblong hole, is thus able to move along the oblong hole of the metering slide, or of the lever arm arranged thereon, and in so doing to compensate the changes in distance associated with the rotation of the metering slide about its pivot axis.

The threaded spindle may preferably be arranged, in particular jointly with the electric motor rotary drive, on the side of the outlet opening, or of the base of the container provided with the outlet opening, that is opposite to the metering slide of the metering element, such that it is protected, or they are protected, against flying particles of spreading material and, at the same time, an extremely compact structure is ensured, with optimum utilization of the only limited structural space available. Consequently, the threaded spindle, and in particular also the motor rotary drive, are expediently arranged—whether in a stationary manner, or whether so as to be displaceable, in particular rotatable, by means of a means for adjusting the point at which the material to be fed onto the distributor disks—on the upper side of the base of the spreading-material container of the distributing machine, which base is provided with the outlet opening, while the metering slide is located beneath the outlet opening. In addition, best possible protection against external influences is provided by a cover that, expediently, covers, or encapsulates, the entire drive of the metering slide, i.e. the threaded spindle including the motor rotary drive, and the respective torque transmission means.

The threaded spindle may preferably be arranged, in particular jointly with its motor rotary drive,
- on the base of the container that is provided with the outlet opening, in particular detachably, or
- on a support flange fastened, in particular detachably, thereto, such that a very compact structure is obtained.

In order to provide for a least possible backlash, the metering slide, if arranged in a pivotable manner, may expediently be mounted directly on the base of the container or, in particular, directly on the support flange fastened, e.g. screw-connected, thereto.

Moreover, in the case of a pivotable mounting of the metering slide of the metering element, it may be advantageous if the rotationally displaceable metering slide has a, for example approximately vertical, pivot axis, which in particular is arranged substantially perpendicularly in relation to the outlet opening, and which passes through the base of the container that is provided with the outlet opening, wherein, on the side of the base that is opposite to the metering slide, a lever arm that is connected in a rotationally fixed manner to its pivot axis is connected to the spindle nut. This not only enables the drive of the metering element to be arranged, as already mentioned above, on the (upper) side of the base, provided with the outlet opening, that is opposite to the metering slide located above the distributing element, but again also renders possible a very space-saving, compact structure that is protected against external influences.

For ease of mounting and demounting, the metering slide and/or the lever arm connecting it to the spindle nut may preferably be detachably connected to the pivot axis of the metering slide, in that, for example, it is screw-connected to a fastening flange of the pivot axis. In this case, the metering slide in the fully mounted state may be, in particular, rigid, i.e. the metering slide itself is connected in a (rotationally) fixed manner to the lever arm that connects it to the threaded spindle, as well as to its pivot axis that, for its part, is pivotably mounted, in particular on the base provided with the outlet opening, or on the fastening flange fixed thereto.

It may additionally be provided in this connection that the lever arm connecting the metering slide of the metering element to the spindle nut is displaceable between, on the one hand, the base of the container that is provided with the outlet opening, or the support flange fastened thereto, and, on the other hand, the electric motor rotary drive of the threaded spindle, in particular substantially parallel to the plane of the base or of the support flange. The motor rotary drive thus extends above the metering slide, and in particular between the threaded spindle, driven in rotation thereby, and the pivot axis of the metering slide, as a result of which an optimal utilization of space is obtained, with the drive of the metering slide being as compact as possible.

As already mentioned, the electric motor rotary drive of the threaded spindle is expediently accommodated in a housing, in order to provide all functional components with best possible protection against external influences and, in particular, to reliably prevent corrosion resulting from ingress of moisture and aggressive fine particles, such as particles of material to be spread or sown, from mineral fertilizer or road salt, that fly during the spreading or sowing work. For this purpose, the housing, in particular, is designed so as to be substantially dust-tight and liquid-tight, the output shaft of the electric motor rotary drive being sealed against the housing, in particular by means of at least one mechanical face seal. Owing to the purely rotational movement of the output shaft of the electric motor rotary drive, in this case a very simple sealing, of the output shaft with respect to the housing, is obtained by means of conventional seals. As already mentioned, a covering, preferably of the entire drive of the metering slide, also proves to be advantageous.

As also already mentioned, in a preferred design it may additionally be provided that there is at least one transmission, in particular in the form of a coupled transmission, coaxial transmission, bevel-gear transmission and/or planetary-gear transmission, assigned to the electric motor rotary drive, the electric motor rotary drive being able to be accommodated with the transmission, in particular in the manner of a geared motor, in a single, common housing, or the motor rotary drive, and possibly one or more transmission(s) downstream of the latter, may be accommodated in separate housings that are fastened to the housing of the electric motor rotary drive, in order to provide for an all-round enclosure of the components and of the rotary drive and also of the transmission. Owing to the fact that the transmission steps down the rotational speed of the electric motor rotary drive, in particular to a (an appreciably) lesser rotational speed, on the one hand an electric motor having a comparatively low power can be used, and on the other hand, in particular, an extremely precise control of the metering slide of the metering element can be ensured, since, owing to the transmission downstream of the electric motor, a plurality of revolutions of the latter result only in a partial revolution of its output shaft. In the case of the transmission, according to the invention, of the exclusively rotational movement of the output shaft to the axially fixed threaded spindle, the efficiency that can be achieved with such a drive unit, formed from an electric-motor rotary drive and a downstream transmission, is in the order of magnitude of at least 40% or more. The type of transmission selected is determined primarily by the very limited structural space available beneath the container in distributing machines of the generic type, with, for example, a planetary-gear transmission, a coupled transmission or a bevel-gear transmission, or combinations of coupled transmissions or bevel-gear transmissions with coaxial transmission having been found to be suitable.

In a further expedient design, it may be provided that a position-sensing sensor, known per se from the prior art, in particular in the form of an angular displacement sensor that is able to sense the angular position of the respective shaft, and/or in the form of a rotational-speed sensor that is able to sense the number of revolutions of the respective shaft, is assigned to the output shaft of the electric motor rotary drive, or at least to another shaft thereof, or of a transmission thereof. The sensor in this case may expediently be connected to an open-loop and/or closed-loop control means of the distributing machine. In the absence of a translational, or telescoping, displacement of the output shaft of the electric motor rotary drive, which output shaft is merely driven in rotation, but is axially fixed, the rotary drive, besides having a very high long-term tightness of seal, in particular has the advantage of such a sensor being accommodated in a functionally secure manner in the housing of the electric motor rotary drive, or in a transmission housing downstream of, or common with, the latter, such that the electric-motor drive unit can be configured substantially in the manner of a servomotor, for example in the form of a brushless direct-current motor. The position-sensing sensor of such an electric-motor rotary drive serves in this case to sense the actual position of the spindle nut, or of the metering slide connected thereto, in particular in real time, such that the setpoint position can be readjusted, if necessary, by means of the open-loop and/or closed-loop control means of the distributing machine. Practically any known sensors that are able to sense the rotational speed and/or the angular position of shafts are suitable as position-sensing sensors. Merely as examples, inductive pick-ups, Reed sensors, magneto-restrictive sensors and the like may be mentioned in this connection.

The open-loop and/or closed-loop control means may also comprise, for example, a control board, which may equally be housed in the permanently sealed housing of the electric motor rotary drive or, also, in a separate operating module, or operating terminal. It may, in the usual manner, expediently have an input means for inputting commands to the open-loop and/or closed-loop control means in accordance with the desired settings of the metering slide of the metering element, and also further functional parts of the distributing machine, such as means for adjusting the feed point and the like. The input means may be accommodated, for example, in the driver's cabin of a towing machine, such as a tractor or a road vehicle, or be constituted by a portable operating panel, in order to provide for the desired remote control capability in the usual manner.

While in principle the electric-motor rotary drive may also have its own electrical power supply means, such as a battery, an accumulator or the like, it may preferably be supplied with electrical power from the electrical power supply of a towing machine, such as a tractor or a road vehicle. In this case, the electric-motor rotary drive may have, in particular, an electrical interface that can be connected to the electrical power supply of the towing machine.

As an alternative or in addition to a position-sensing sensor, of the type described above, assigned to the electric motor rotary drive of the threaded spindle, it may also be provided, for example, that, assigned to the spindle nut, or the sliding block, that can be displaced along the threaded spindle, there is a position-sensing sensor, in particular in the form of a sliding contact or rubbing contact that is arranged on a wall extending parallel to the threaded spindle and that acts in combination with the spindle nut, or the sliding block, which may be advantageous insofar as the position of the threaded spindle is directly representative of the metering slide mechanically connected thereto. The position-sensing sensor in this case may again be expediently connected, in the manner described above, to a open-loop and/or closed-loop control means of the distributing machine.

Furthermore, it may be provided, according to an advantageous development, that fixed, in particular detachably, to the metering slide of the metering element there is a handle, such as substantially in the form of an operating lever extending away therefrom, to enable the metering slide to be actuated manually. The handle in this case may be fastened, in particular rigidly, to the metering slide, e.g. to its pivot axis connected in a rotationally fixed manner thereto, and extend approximately radially outward therefrom. It may additionally be permanently, preferably detachably, fastened to the metering slide, or to its pivot axis, e.g. screw-connected thereto, or the metering slide may be equipped with a correspondingly positioned receiver such as, for example, a drilled hole, lugs provided with drilled holes, or the like, with which the handle, realized as a separate operating part, can be brought into detachable actuating engagement when required. It is thereby possible, in the case of a malfunction of the electric motor rotary drive of the threaded spindle or of its electrical power supply, such as the electrical system of a towing machine, to put the metering slide manually into its closed position, to enable the distributing machine to be removed without material to be distributed, still present in the container when the metering slide is (partially) open, being able to trickle out through the outlet opening, which would not only result in both economic and environmental damage, but in particular would also constitute a high safety risk in terms of a slip hazard if, due to the usual shaking and vibrations during travel, the material to be distributed should get onto public roads.

Moreover, the distributing machine may be, for example, a single-disk, dual-disk or multi-disk spreader, having at least two, in particular precisely two, outlet openings, which are arranged on the base of the container, and arranged downstream of each of which is a metering element having a respective metering slide, and arranged downstream of each of which is a distributing element, downstream of the metering element, to distribute the material to be distributed on the ground, a separate drive according to the invention being assigned, in particular, to each metering slide of a respective metering element to enable the metering elements to be controlled, by open-loop or closed-loop control, independently of each other.

Further features and advantages of the invention will become apparent from the following description of exemplary embodiments, with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
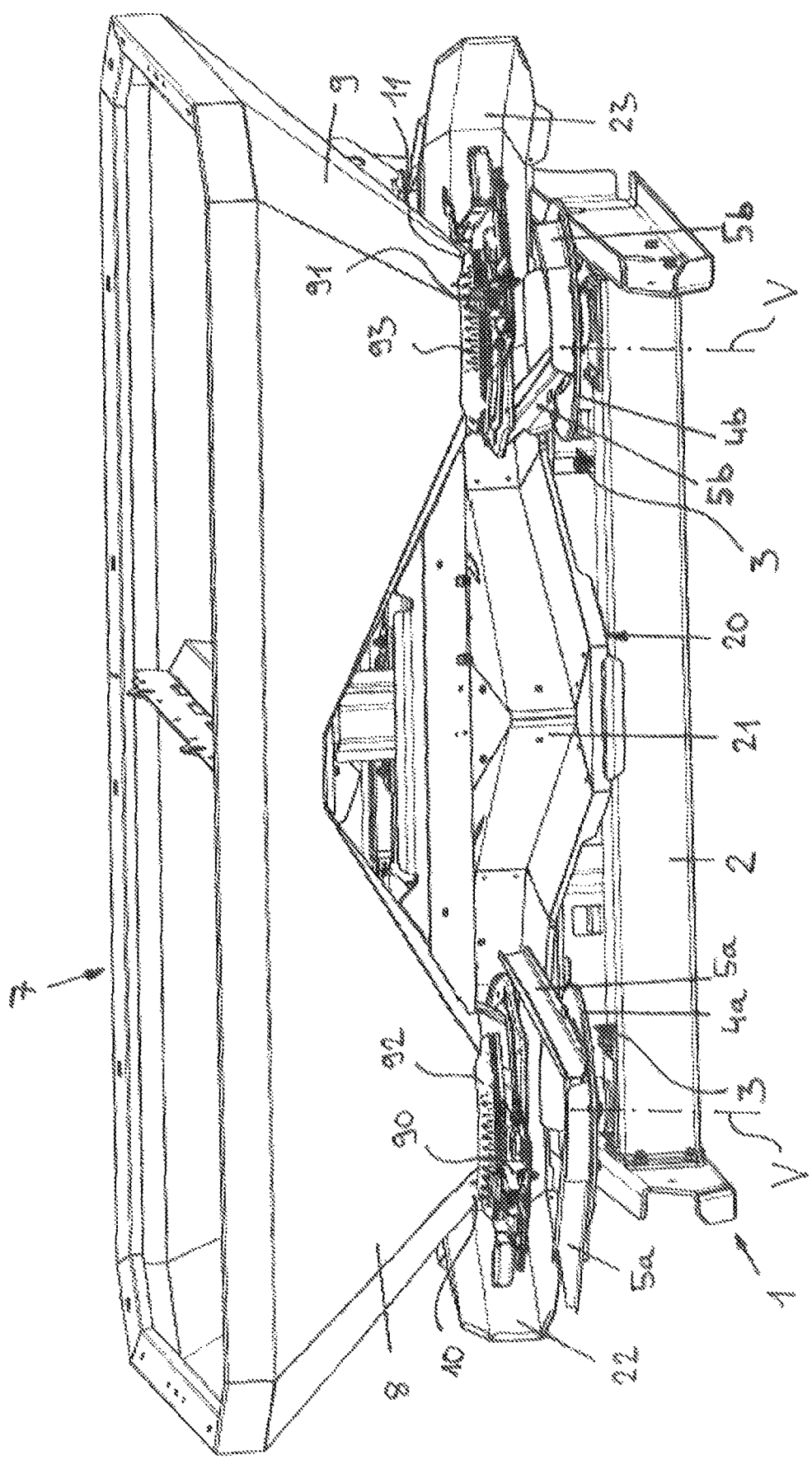
FIG. 1 is a schematic, perspective view, viewed obliquely from below of a distributing machine realized in the form of an agricultural dual-disk spreader.

Referring to the drawings, the distributing machine represented in FIG. 1, in the form of a dual-disk spreader for agricultural purposes, has a frame 1 having a crosspiece 2 that, in the case of a mechanical drive of the distributing elements 3 being derived from the power take-off of a towing machine, such as a tractor, takes up a transverse force, while, in the case of an adjustable-speed hydraulic or, in particular, electrical drive (not shown), the hydraulic or electric motors assigned to each distributing element 3 may be fixed to the crosspiece 2. The distributing elements 3 are realized in the form of distributor disks 4a, 4b, which are driven in rotation about an approximately vertical axis of rotation V and which, in the usual manner, are equipped with projection vanes 5a, 5b.

The distributing machine additionally has a container 7, which serves to store the material to be distributed such as, in particular, fertilizer or seed, and which in the present case comprises two container parts 8, 9, tapering downward approximately in the form of funnels, that at the lower end each transition into a lower part 10, 11 having a downwardly open base ring (not visible in FIG. 1). Arranged directly beneath a respective base ring of the lower parts 10, 11 of a respective container part 8, 9 there is a respective base 14, shown by FIGS. 2 and 3, having an outlet opening, or metering opening 16, (cf. FIG. 2), the clear cross section of which can be controlled by electric motor to open and close by means of a—in this case rotationally—displaceable metering slide 18 of a metering element for the purpose of setting the desired mass flow rate of material to be distributed, between a closed position, in which the metering slide 18 completely closes the outlet opening 16, and a fully open position, and any partially open positions. The metering slide 18 that acts in combination with a respective outlet opening 16 in this case is again located immediately beneath a respective base 14 that is provided with the outlet opening 16, and is mounted so as to be pivotable about a substantially vertical axis D that is approximately perpendicular to the base 14 (regarding which, see also FIGS. 4 to 6). For the purpose of mechanically limiting its pivoting capability, the metering slide 18 may additionally be equipped, for example, with an oblong hole 15, which extends around a corresponding circumferential portion thereof and in which there engages a stud 17, arranged in a stationary manner on the underside of a respective base 14, in such a manner that, as the metering slide 18 pivots about its pivot axis D, the stud is displaced along the oblong hole 15 and—as viewed in the circumferential direction—impinges against the opposite ends of the oblong hole 15 when the metering slide is, on the one hand, in the closed position and, on the other hand, in the maximally open position.

Figure 2:
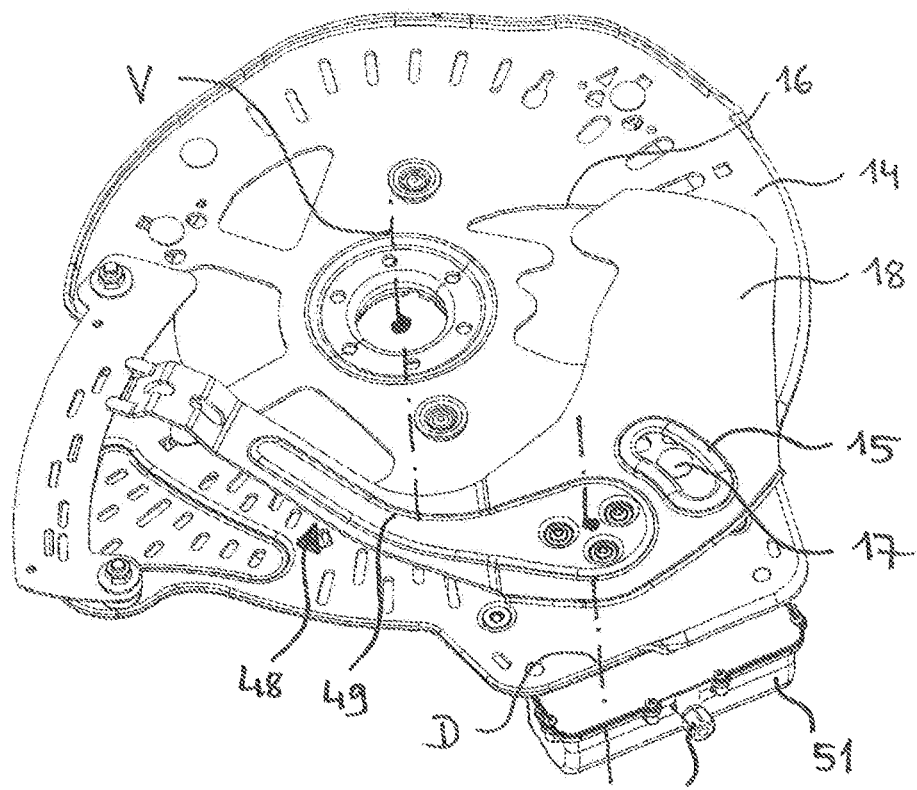
FIG. 2 is a schematic, perspective view, viewed obliquely from below of an embodiment of one of the metering elements of the distributing machine according to FIG. 1, with a pivotably mounted metering slide acting in combination with an outlet opening in the base of the container.
Figure 3:
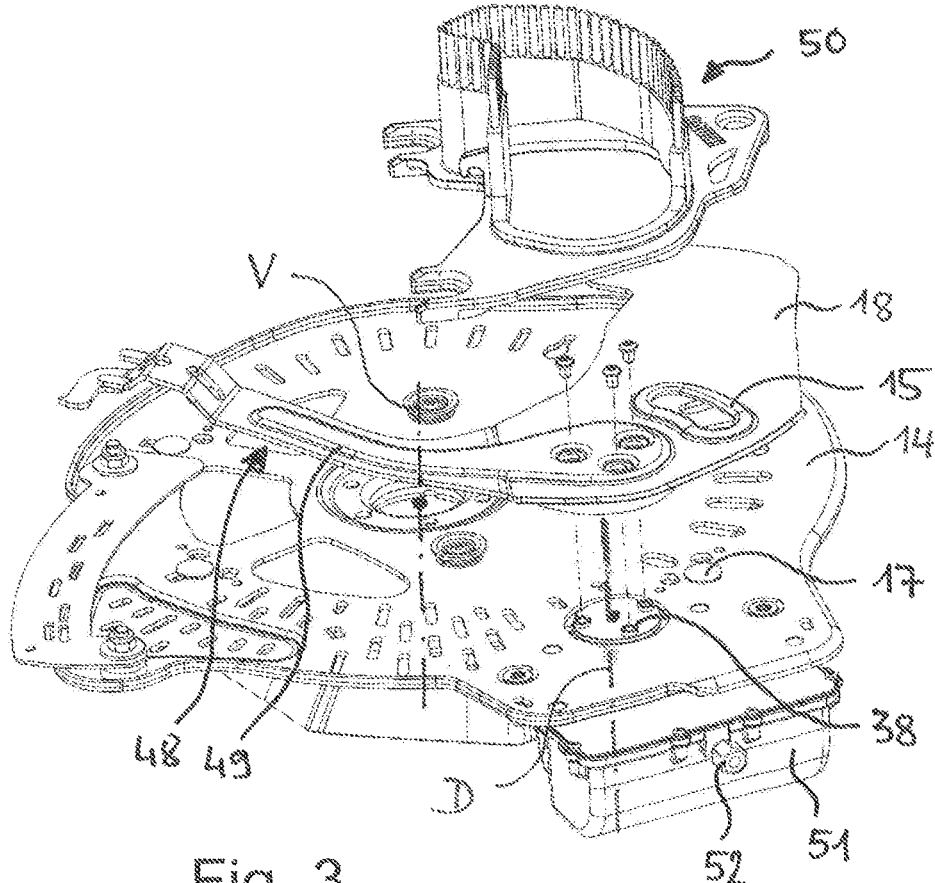
FIG. 3 is a schematic, exploded, perspective view of the metering element, corresponding substantially to FIG. 2, and including an outlet chute that, likewise, is fixed to the underside of the base of the container.

Furthermore, shown in FIGS. 2 and 3 is a handle 48, configured in the form of an operating lever 49, extending away approximately radially outward, substantially from its pivot axis D or to the side thereof, which serves, if necessary, for manual actuation of the metering slide 18. In the present case, the operating lever 49 is fastened rigidly but detachably, by means of screws, to the metering slide 18, but may also, for example, be integrally connected to the latter, or realized in the manner of a separate tool that can be inserted a corresponding receiver of the metering slide 18 as required (not shown). In this way, if a malfunction of the metering element, its drive or its electrical power supply should occur during field work, the metering slide 18 of the metering element can be closed, for example manually, by means of the handle 48 to enable the distributing machine to be removed without loss of material to be distributed. The exploded representation according to FIG. 3 additionally shows an outlet chute 50, which can be detachably fixed to the underside of the base 14, and which expediently extends to immediately above the distributor disks 4a, 4b, and inside which the material to be spread can be transferred from the metering element to the respective distributor disk 4a, 4b. Such outlet chutes are known from the prior art.

As again evident from FIG. 1, the distributing machine may furthermore be equipped with a distributor-disk protection 20, which partially surrounds the distributor disks 4a, 4b with the projection vanes 5a, 5b. In the present case, it is composed of a plurality of interconnected portions of metal plate, of which a middle portion 21 is arranged between the distributor disks 4a, 4b and the container parts 8, 9, in particular the lower parts 10, 11, thereof, and a further curved portion 22, 23 respectively surrounds the distributor disks 4a, 4b—as viewed in the direction of travel—in their front region.

Furthermore, a respective distributing element 3, in the form of the distributor disks 4a, 4b, may have an assigned means, not represented in detail in the drawing, for adjusting the point at which the material to be distributed is fed onto the distributor disks 4a, 4b, which means comprises, for example, a mounting of the base 14 of the container parts 8, 9 of the container 7 that is rotatable coaxially with the axis of rotation V of the distributor disks, and a corresponding rotary drive—whether manual or, in particular, motor or actuator—of the bases 14, as is known per se from the prior art, such as, for example, from the document EP 2 057 876 A1 cited at the outset. The metering or outlet opening 16 located in the bases 14 can thereby be displaced, e.g. along a circular path around a circumferential portion around the distributor disk 4a, 4b, as a result of which the feed point is adjustable in the circumferential direction of the distributor disk 4a, 4b. In this case, for example, connected to each rotatable base 14 there may be a position indictor 90, 91 in the form of a pointer, merely indicated in FIG. 1, which acts in combination with a scale 92, 93 that is fixed in a stationary manner to a respective container part 8, 9 of the container 7, which scales are provided with a scale marking that represents the position of the feed point.

Figure 4:
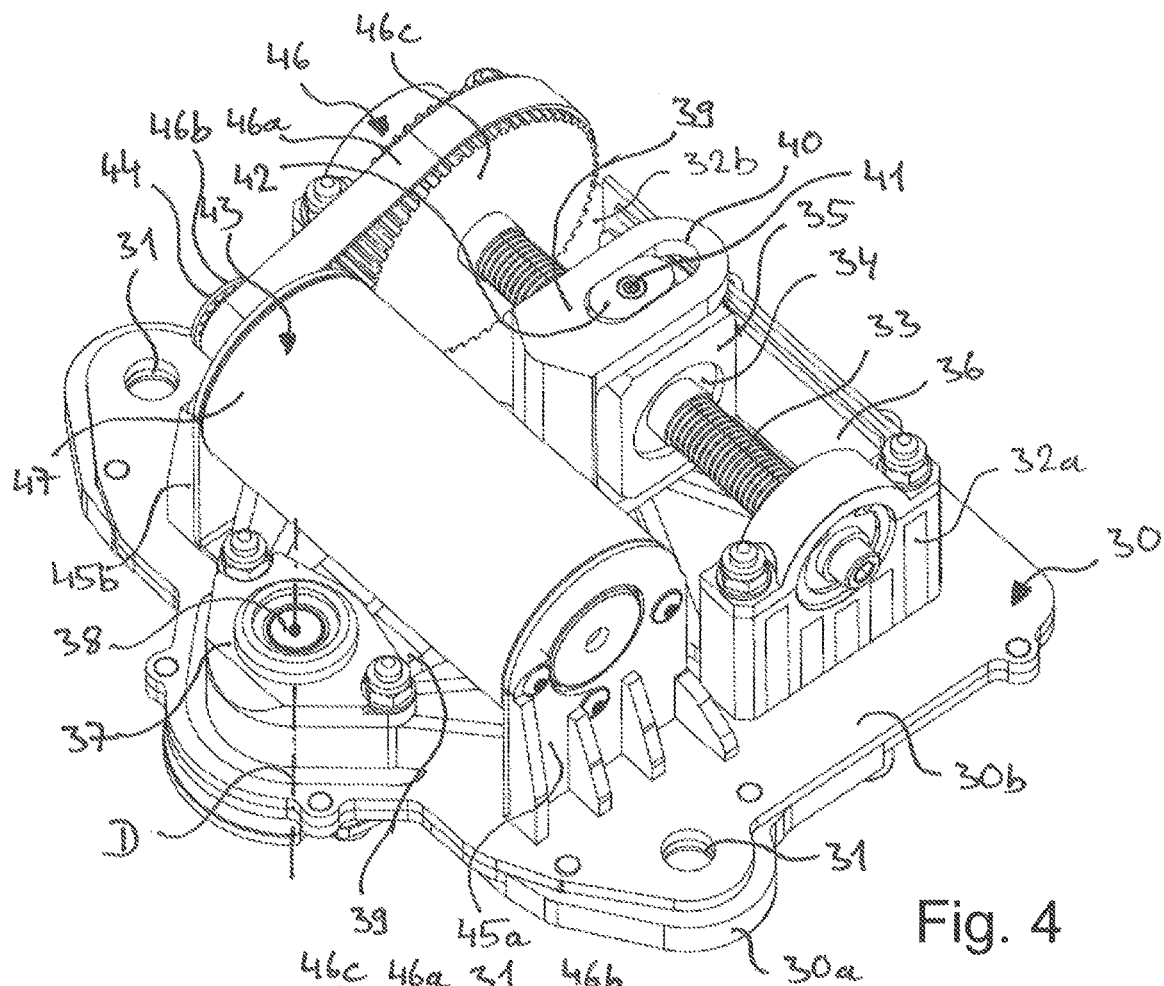
FIG. 4 is a schematic, perspective view of an embodiment of a drive, according to the invention, of the metering slide of the metering element according to FIGS. 2 and 3, which comprises a spindle nut, which is guided along a threaded spindle that is driven in rotation, and which is in engagement therewith, and which is connected to a lever arm of the metering slide, viewed obliquely from above.
Figure 5:
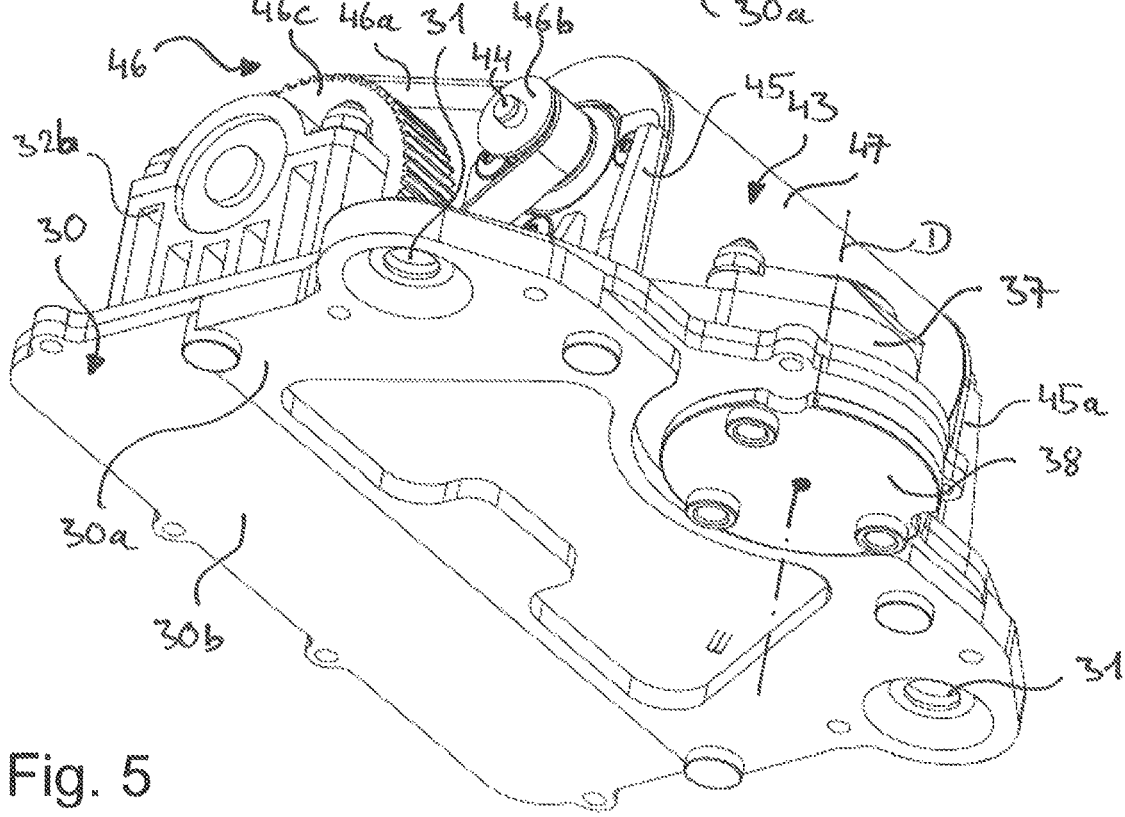
FIG. 5 is a schematic, perspective view of the drive of the metering slide according to FIG. 4, viewed obliquely from below.
Figure 6:
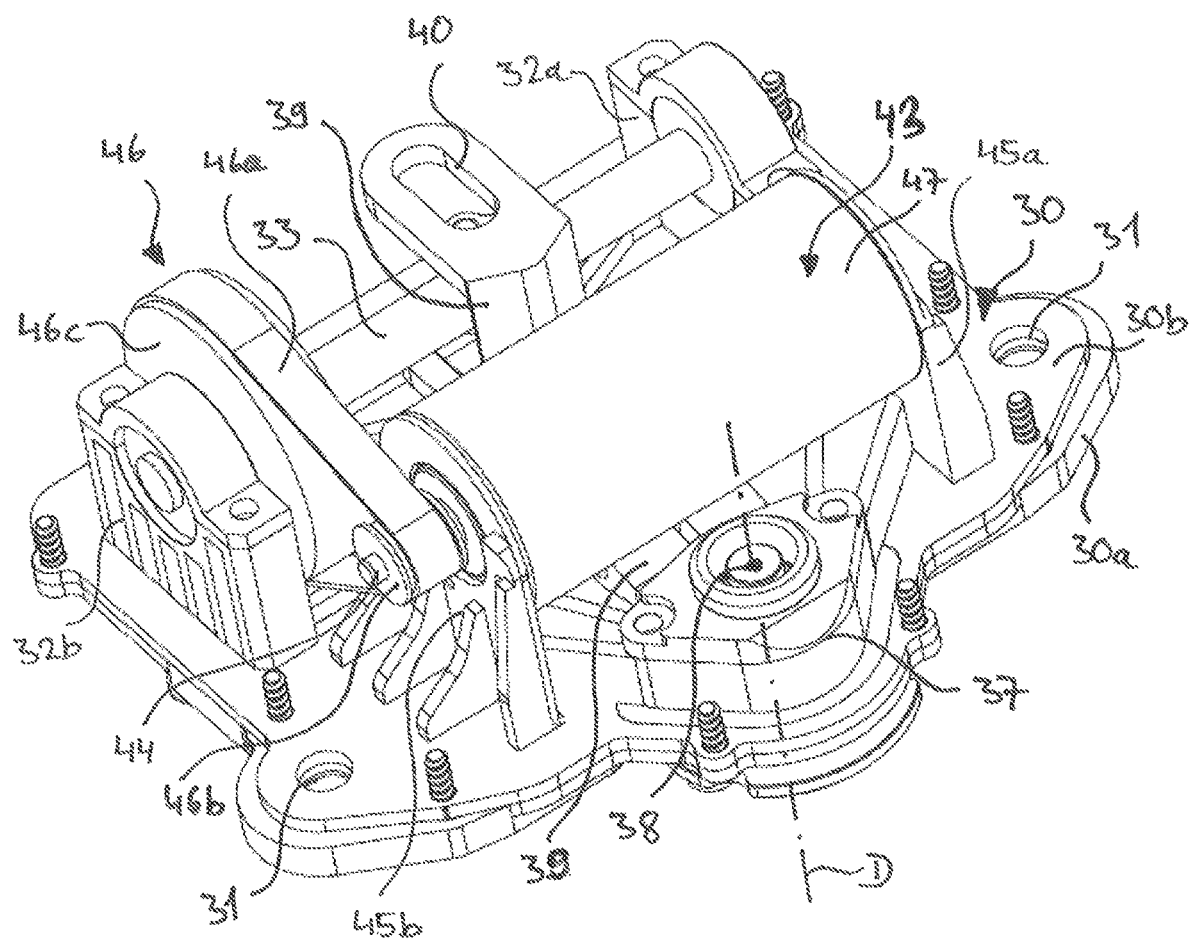
FIG. 6 is a schematic, perspective view of the drive of the metering slide according to FIGS. 4 and 5, similar to FIG. 4, viewed obliquely from above, but with the spindle nut removed to show the arrangement of the lever arm fixed to the metering slide.

Represented in FIGS. 4 to 6 are differing views of an exemplary embodiment of a drive, according to the invention, of the metering slide 18 of the metering element, the components of which drive, in the present case, are detachably fixed to a support flange 30 that is detachably fixed, e.g. by means of screws (not shown) that engage in corresponding drilled holes 31, to the side of the base 14, provided with the outlet opening 16, that is opposite to the metering slide 18, but outside of the container 7; 8, 9 (cf. FIG. 1), not shown again in FIGS. 4 to 6, such that the drive is optimally protected against the particles of spreading material spun out by the distributor disks 4a, 4b during operation. In the present case, the support flange 30 is of a two-part design and comprises, on the one hand, a support plate 30a on its side that faces toward the base 14, and on the other hand, on its side that faces away from the base 14, a mounting plate 30b, equipped with fastening elements, described in greater detail in the following, for holding the various components of the drive of the metering slide 18, the support plate 30a and the mounting plate 30b of the support flange 30 being jointly screw-connected to the base 14 by means of aligned drilled holes 31. The two-part design of the support flange 30 in this case provides the possibility, in particular, of being able to select differing materials for this purpose, it being possible, for example, for the support plate 30a to be produced from metal materials in order to impart a very high degree of mechanical strength and stiffness to the support flange 30, while the mounting plate 30b provided with the fastening elements may be produced, in particular as a single piece, from plastic, in order to achieve cost-effective manufacture, e.g. by means of injection molding. Clearly, however, the support flange 30 may also be realized as a single piece, such as, for example, as a shaped part made of cast metal or injection molding (not shown). While the metering slide 14, whose pivot axis D, in the case of the exemplary embodiment shown, passes approximately perpendicularly through the base 14, may in principle also be mounted on the base 14, it the present case it likewise is mounted on the support flange 30—here: on the mounting plate 30b thereof—and perpendicularly in relation thereto, the support flange 30—or, more precisely: its mounting plate 30b—having a corresponding bearing bush 37 for this purpose.

The drive of the metering slide 18, which is entirely without telescoping parts, comprises a threaded spindle 33 that is driven in rotation but is axially fixed, e.g. rotatably mounted on corresponding bearing blocks 32a, 32b of the support flange 30, or of its mounting plate 30b, and that extends substantially perpendicularly in relation to the pivot axis D of the metering slide 18, and both at a distance from and approximately tangentially in relation to the same. A spindle nut 34, which can be seen only in FIG. 4, is in engagement with the threaded spindle 33, and is guided along the threaded spindle 33, i.e. in the axial direction thereof, such that, as the threaded spindle 33 rotates, it moves translationally along it. For the purpose of guiding the spindle nut 34, a sliding block 35, for example, likewise visible only in FIG. 4, may be provided, in which it is arranged in a rotationally fixed manner, and/or it is formed integrally with it. There may be assigned to the sliding block 35 a usual guide groove (not visible in the drawings), which extends parallel to the threaded spindle 33 and which may be arranged on the support flange 30, or on the mounting plate 30b itself thereof and/or, for example, in a wall 36 connecting the bearing blocks 32a, 32b (cf. again FIG. 4).

As can be seen from FIGS. 4 to 6 in combination with FIGS. 3 and 4, the metering slide 18 of the metering element is consequently screw-connected, together with the handle 48 serving as an operating lever 49, to a shaft flange 38 that passes approximately perpendicularly through the base 14 and forms its pivot axis D, and that, for its part, is pivotably mounted in the bearing bush 37 of the support flange 38. As shown by FIGS. 4 to 6 and best by FIG. 6, the shaft flange 38 that forms the pivot axis D of the metering slide 18 is additionally connected in a rotationally fixed manner, at its end that is opposite to the metering slide 18, i.e. on its side of the base 14 that is opposite to the metering slide 18, to a lever arm 39 in order to actuate it by rotation of the threaded spindle 33 and resultant displacement of the spindle nut 34 along the same. For this purpose, the lever arm 39 is connected to the spindle nut 34, which in the present case is effected via the sliding block 35 that is connected in a rotationally fixed manner to the spindle nut 34.

In order to compensate the differing distances of the spindle nut 34, or of the sliding block 35, in relation to the pivot axis D of the metering slide 18, according to which axial position of the threaded spindle 33 that the spindle nut 34 is in at a particular time, the lever arm 39, at its end that is opposite to the shaft flange 38 that forms the pivot axis D, facing toward the spindle nut 34, has an oblong hole 40 that extends substantially in the radial direction in relation to the pivot axis D, or substantially in the direction of extent of the lever arm 39. The sliding block 35 connected to the spindle nut 34, in turn, has a driver 41 (cf. FIG. 4), which engages in the oblong hole 40 of the lever arm 39 and expediently extends approximately perpendicularly both in relation to said oblong hole and to the axial direction of the threaded spindle 33, and which, for ease of mounting, is preferably detachably fastened to the spindle nut 34, or to the sliding block 35, for example screw-connected thereto. While the driver 41 may be constituted, for example, by a stud having a round (circular) cross section of a diameter approximately corresponding to the width of the oblong hole (40) (not shown), in the case of the present exemplary embodiment, for the purpose of a yet more exact and absolutely zero-backlash guidance in the oblong hole 40, it comprises a formed piece 42, having two opposite edge portions that are parallel to the longitudinal edges of the oblong hole 40 and the distance of which corresponds approximately to the width of the oblong hole 40, the length of the formed piece 41 being dimensioned in such a manner, in particular, that it impinges against the ends of the oblong hole 40 only when the lever arm 39 in each case has attained a position, pivoted about the pivot axis D, that corresponds to the closed position, or to the fully open position of the metering slide 18, in which it completely frees the outlet opening 16 of the base 14 (see FIG. 2).

As is furthermore shown by FIGS. 4 to 6, the drive of the metering slide 18 additionally has an electric-motor rotary drive 42, which serves to drive the threaded spindle 33 rotationally, in that it transmits an exclusively rotational movement to it. While the axially fixed output shaft 44 of the electric-motor rotary drive 42, formed by a shaft stub, may in principle also be arranged, for example, coaxially with the threaded spindle 33 and connected to it in a rotationally fixed manner (not shown), in the case of the present embodiment it is provided—not least with regard to a very compact structure of the drive—that the electric-motor drive unit 43 is arranged approximately parallel to the threaded spindle 33, and between the same and the pivot axis V of the metering slide 18, it being likewise fixed to the support flange 30—or, more precisely: to holding parts 45a, 45b of its mounting plate 30b that are provided for this purpose—in a detachable manner. The electric-motor rotary drive 42 in this case overlaps, for example, the lever arm 39 of the metering slide 18, which consequently is pivotably displaceable, about the pivot axis D, between the surface of the support flange 30—or, more precisely: its mounting plate 30b—and the electric-motor rotary drive 42, in a plane extending parallel to the support flange 30 and to the base 14. Consequently, the output shaft 44 of the electric-motor rotary drive 42, mounted in an axially fixed manner, likewise extends parallel to the threaded spindle 33, a toothed belt drive 46 serving in the present case to transmit the rotational movement of the output shaft 44 to the threaded spindle 33, which toothed belt drive comprises a toothed belt 46a that is in engagement, on the one hand, on a toothed-belt wheel 46b seated in a rotationally fixed manner on the output shaft 44, and on the other hand with a toothed-belt wheel 46c seated in a rotationally fixed manner on the axis of rotation of the threaded spindle 33. The toothed-belt wheel 46b seated on the output shaft 44 in this case is preferably (appreciably) smaller than the toothed-belt wheel 46b seated on the axis of rotation of the threaded spindle 33, in order to provide for stepping-down of the rotational speed of the output shaft 44 of the electric-motor rotary drive 42 and thereby to provide, not only for a very rapid, but also very exact, displacement, or setting, of the metering slide 18 to its desired open position in relation to the outlet opening 16. Clearly, instead of the toothed belt drive 46, other torque transmission means may also be provided, such as frictional or vee-belt drives, meshing toothed wheels or the like (not shown).

The electric-motor rotary drive 42 expediently has an electric motor accommodated in a housing 47; the electric motor may be, in particular, a geared motor that is equipped with a transmission of practically any known design. The output shaft 44 of the electric-motor rotary drive 42 in this case passes through the housing 47, at the end face thereof, and is sealed against the latter in a dust-tight and liquid-tight manner by means of a mechanical face seal 40, not represented in the drawing. Preferably, there may also be accommodated in the housing 47 of the electric-motor rotary drive 42 position-sensing sensors, likewise not represented in the drawing, that, for example in the manner of angular-displacement and/or rotational-speed sensors, are able to sense the exact angular position of the output shaft 44 or of another shaft, e.g. of the transmission, and consequently the position of the metering slide 18 corresponding thereto. The position-sensing sensor(s) is or are operatively connected to an open-loop and/or closed-loop control means (likewise not represented) of the distributing machine, in order to set the desired metering quantities, or mass flow rates, of material to be distributed, and in particular to control these by closed-loop control on the basis of the actual mass flow rate of material to be distributed, likewise sensed by sensor means, and possibly also in dependence on the position, for example sensed by means of GPS, of the distributing machine on the field during the spreading work. The electric-motor rotary drive 42 may consequently be designed in the manner of a servomotor such as, for example, a brushless DC motor.

As an alternative or in addition to the position-sensing sensor(s) of the electric-motor rotary drive 42, there may also be assigned, for example, to the spindle nut 34 that can be displaced along the threaded spindle 33, or to the sliding block 35 connected in a rotationally fixed manner thereto, a position-sensing sensor (not shown) which, for the aforementioned purposes, is likewise connected to the open-loop and/or closed-loop control means of the distributing machine, and which may be realized, for example, in the form of a sliding contact or rubbing contact that is arranged on the wall 36 extending parallel to the threaded spindle 33 (cf. FIG. 4) and that acts in combination with the spindle nut 34, or with the sliding block 35.

The electric-motor rotary drive 42, like the possibly present position-sensing sensors, may expediently be able to be connected to the electrical power supply of the towing machine via an electrical interface (not shown) provided on the distributing machine or on a towing machine of the same, such as, for example, a tractor, such that the distributing machine itself does not require its own electrical power supply, but is supplied with electrical energy from the electrical system of the towing machine.

Finally, it proves expedient to encapsulate the entire drive of the metering slide 18 for the purpose of protecting against external influences, which may be effected, for example, by means of a cover 51 that can be put onto the support flange 30—or, more precisely: onto its mounting plate 30b—and of which the portion that faces toward the pivot axis D can be seen in FIGS. 2 and 3, and that comprises, for example, an inlet, provided with a threaded body, for an electrical cable (not shown) serving to supply electrical power to the electric-motor rotary drive 42. The cover 51 in this case may be realized in the form of a covering cap that can be put onto the support flange 30 and that covers the entire drive of the metering slide 18, including the electric-motor rotary drive 42, the belt drive 46, the threaded spindle 33, with the spindle nut 34 that can be displaced along it and the lever arm 39 fixed thereto, as well as the shaft flange 38.

While specific embodiments of the invention have been shown and described in detail to illustrate the application of the principles of the invention, it will be understood that the invention may be embodied otherwise without departing from such principles.

The invention claimed is:

1. A distributing machine comprising:
a support frame;
at least one container supported by the support frame, for receiving powdered and/or particulate material to be distributed;
at least one outlet opening arranged on a base of the at least one container;
a metering element arranged downstream of the outlet opening, the metering element comprising a motor-driven metering slide that can be rotationally displaced relative to the outlet opening; and
at least one distributing element arranged downstream of the metering element, for distributing the material to be distributed on the ground, wherein:
a drive of the metering slide of the metering element comprises a threaded spindle mounted axially fixed and driven in rotation by a motor rotary drive having an axially fixed output shaft;
a spindle nut is guided along the threaded spindle and is in engagement with the threaded spindle and
the spindle nut is connected to the metering slide via a lever arm arranged on the spindle nut to actuate the metering slide by rotation of the threaded spindle, wherein the rotationally displaceable metering slide of the metering element has a pivot axis which passes through the base of the at least one container that is provided with the outlet opening, wherein, on a side of the base that is opposite to the metering slide, the lever arm, that is connected in a rotationally fixed manner to the metering slide pivot axis, is connected to the spindle nut.

2. The distributing machine as claimed in claim 1, further comprising an electric-motor rotary drive, wherein the threaded spindle is driven in rotation by means of the electric-motor rotary drive.

3. The distributing machine as claimed in claim 2, wherein the electric-motor rotary drive is supplied with electrical power from an electrical power supply of a towing machine, comprised of a tractor or a road vehicle, wherein the electric-motor rotary drive has an electrical interface that can be connected to the electrical power supply of the towing machine.

4. The distributing machine as claimed in claim 1, wherein the threaded spindle is comprised by an output shaft of the motor rotary drive or is connected to the output shaft of the motor rotary drive.

5. The distributing machine as claimed in claim 1, further comprising a drive connection connecting the threaded spindle to the output shaft of the motor rotary drive, the drive connection comprising a belt drive or meshing toothed wheels.

6. The distributing machine as claimed in claim 1, wherein the output shaft of the motor rotary drive is arranged parallel to the threaded spindle.

7. The distributing machine as claimed in claim 1, wherein the metering slide of the metering element can be displaced at least
rotationally, about the pivot axis which is arranged substantially perpendicularly in relation to the axial direction of the threaded spindle and/or at a radial distance therefrom.

8. The distributing machine as claimed in claim 1, wherein the spindle nut is guided along the threaded spindle by means of a sliding block, in which the spindle nut is fastened rotationally fixed.

9. The distributing machine as claimed in claim 8, wherein the spindle nut or the sliding block has at least one driver, which is detachable and which extends substantially perpendicularly in relation to an axial direction of the threaded spindle, and which is in engagement with an oblong hole of the metering slide or of a lever arm arranged thereon.

10. The distributing machine as claimed in claim 1, wherein the threaded spindle is arranged jointly with the motor rotary drive, on a side of the outlet opening that is opposite to the metering slide of the metering element.

11. The distributing machine as claimed in claim 1, wherein the threaded spindle is arranged detachably, on the base of the at least one container that is provided with the outlet opening, or on a support flange fastened thereto.

12. The distributing machine as claimed in claim 1, wherein the pivot axis of the rotationally displaceable metering slide of the metering element is arranged substantially perpendicularly in relation to the outlet opening of the at least one container.

13. The distributing machine as claimed in claim 12, wherein the metering slide and/or the lever arm connecting the metering slide to the spindle nut is detachably connected to the pivot axis of the metering slide.

14. The distributing machine as claimed in claim 1, wherein the spindle nut is connected to the metering slide via a lever arm arranged on the spindle nut and the lever arm connecting the metering slide of the metering element to the spindle nut is displaceable between the base of the at least one container that is provided with the outlet opening, or the support flange fastened thereto, and the motor rotary drive of the threaded spindle, parallel to the plane of the base or of the support flange.

15. The distributing machine as claimed in claim 1, further comprising a motor housing, wherein the motor rotary drive is accommodated in the motor housing, wherein the motor housing
is configured to be dust-tight and liquid-tight, and/or
an axially fixed output shaft of the motor rotary drive is sealed against the motor housing by at least one mechanical face seal.

16. The distributing machine as claimed in claim 1, wherein the motor rotary drive has at least one transmission comprising a coupled transmission, a coaxial transmission, a bevel-gear transmission and/or a planetary-gear transmission.

17. The distributing machine as claimed in claim 1, wherein a position-sensing sensor, comprised of an angular displacement sensor and/or a rotational-speed sensor, which is connected to an open-loop and/or closed-loop control of the distributing machine, is assigned to the output shaft of the motor rotary drive, or at least to another shaft of the motor rotary drive, or of a transmission thereof.

18. The distributing machine as claimed in claim 1, further comprising a position-sensing sensor, wherein the position-sensing sensor is assigned to the spindle nut that can be displaced along the threaded spindle, and the position-sensing sensor, comprised of a sliding contact or rubbing contact that is arranged on a wall extending parallel to the threaded spindle and that acts in combination with the spindle nut, is connected to an open-loop and/or closed-loop control of the distributing machine.

19. The distributing machine as claimed in claim 1, further comprising a handle fixed detachably to the metering slide forming an operating lever extending away therefrom, to enable the metering slide to be actuated manually.

* * * * *